United States Patent
Szasz et al.

(10) Patent No.: US 12,422,290 B2
(45) Date of Patent: Sep. 23, 2025

(54) SYSTEM AND METHOD FOR DETERMINING AT LEAST ONE CALCULATED PROCESS PARAMETER OF A FLUID IN A PIPE

(71) Applicant: ABB Schweiz AG, Baden (CH)

(72) Inventors: Paul Szasz, Plankstadt (DE); Joerg Gebhardt, Mainz (DE)

(73) Assignee: ABB Schweiz AG, Baden (CH)

( * ) Notice: Subject to any disclaimer, the term of this patent is extended or adjusted under 35 U.S.C. 154(b) by 333 days.

(21) Appl. No.: 18/312,909

(22) Filed: May 5, 2023

(65) Prior Publication Data

US 2023/0358585 A1    Nov. 9, 2023

(30) Foreign Application Priority Data

May 6, 2022    (EP) .................................... 22172013

(51) Int. Cl.
*G01F 1/68* (2006.01)
*G01D 21/02* (2006.01)
(Continued)

(52) U.S. Cl.
CPC ........... *G01F 1/6884* (2013.01); *G01D 21/02* (2013.01); *G01K 7/427* (2013.01); *G01L 1/2287* (2013.01)

(58) Field of Classification Search
CPC ........ G01F 1/6884; G01F 1/6847; G01F 1/68; G01D 21/02; G01K 7/427; G01K 1/143;
(Continued)

(56) References Cited

U.S. PATENT DOCUMENTS

2005/0235755 A1    10/2005    Hindman
2014/0251020 A1    9/2014    Offer et al.
(Continued)

FOREIGN PATENT DOCUMENTS

AU    2012340150 A1 *    6/2014    ............. G01F 1/684
CA    2095710 C *    8/2003    ............... G01F 1/68
(Continued)

OTHER PUBLICATIONS

Gebhardt et al., "Accurate and quickly responsive surface temperature measurement: a step to widespread non-invasive T-measurement in industry," *2019 IEEE International Instrumentation and Measurement Technology Conference (I2MTC)*, 1 p. (May 20-23, 2019).

(Continued)

*Primary Examiner* — Francis C Gray
(74) *Attorney, Agent, or Firm* — Leydig, Voit & Mayer, Ltd.

(57) ABSTRACT

A system for determining at least one calculated process parameter of a fluid in a pipe includes a data interface receiving nominal process parameters, which relate to nominal parameters of a process that relates to the fluid in the pipe; an invasive temperature sensor that determines a fluid temperature; a reference temperature sensor disposed outside of the pipe for determining a reference temperature; a surface temperature sensor disposed at a surface of the pipe for determining a surface temperature; a process model that determines a process parameter by using the reference temperature, the surface temperature, the received nominal process parameters, and the determined fluid temperature.

12 Claims, 1 Drawing Sheet

Figure 1:
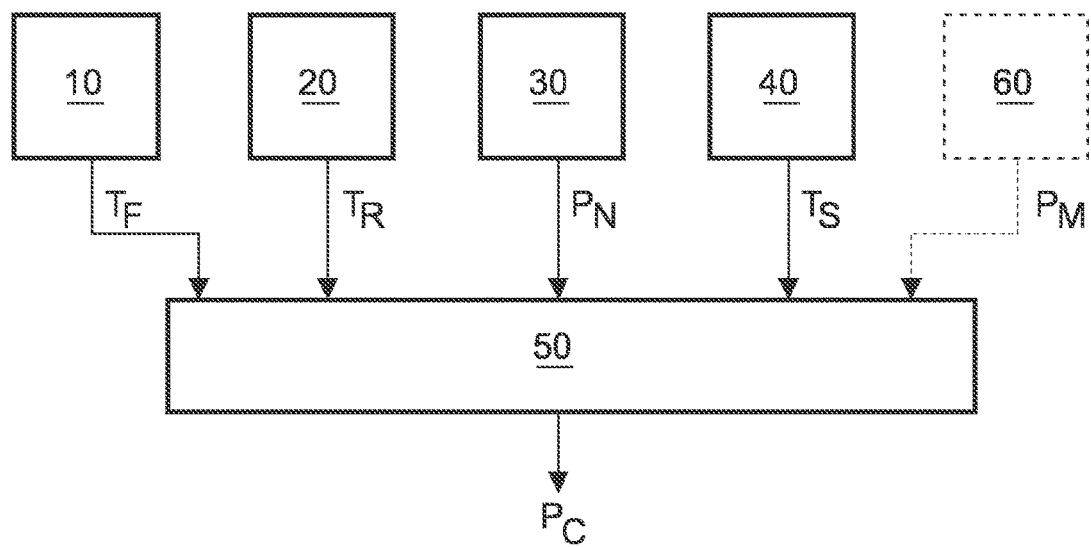

(51) Int. Cl.
  *G01F 1/688* (2006.01)
  *G01K 7/42* (2006.01)
  *G01L 1/22* (2006.01)

(58) Field of Classification Search
  CPC ........ G01K 13/024; G01K 7/02; G01K 13/02;
                G01L 1/2287; G01J 5/00
  See application file for complete search history.

(56) References Cited

U.S. PATENT DOCUMENTS

| | | | |
|---|---|---|---|
| 2016/0187272 A1* | 6/2016 | Ishii | G01K 7/42 |
| | | | 702/136 |
| 2018/0238747 A1* | 8/2018 | Choi | G01K 13/02 |

FOREIGN PATENT DOCUMENTS

| | | | | |
|---|---|---|---|---|
| DE | 102016101862 A1 | 8/2017 | | |
| EP | 0720006 A1 | 7/1996 | | |
| EP | 1014061 A1 * | 6/2000 | ............... | G01K 3/06 |
| EP | 3387405 A1 | 10/2018 | | |
| EP | 3537124 A1 | 9/2019 | | |
| EP | 3537124 B1 | 1/2021 | | |
| ES | 2724775 A1 | 9/2019 | | |
| GB | 2454220 A | 5/2009 | | |
| WO | WO 2016/198430 A2 | 12/2016 | | |
| WO | WO-2016193681 A1 * | 12/2016 | ............... | G01F 1/22 |
| WO | WO 2017/060714 A1 | 4/2017 | | |
| WO | WO 2020/068781 A1 | 4/2020 | | |

OTHER PUBLICATIONS

Gebhardt et al., "Non-invasive temperature measurement of turbulent flows of aqueous solutions and gases in pipes." *tm—Technisches Messen*, 87(9): 553-563 (Sep. 2020).

European Patent Office, Extended European Search Report in European Patent Application No. 22172013.9, 5 pp. (Nov. 2, 2022).

\* cited by examiner

SYSTEM AND METHOD FOR DETERMINING AT LEAST ONE CALCULATED PROCESS PARAMETER OF A FLUID IN A PIPE

CROSS-REFERENCE TO RELATED APPLICATIONS

This patent application claims priority to European Patent Application No. 22172013.9, filed on May 6, 2022, which is incorporated herein in its entirety by reference.

FIELD OF THE DISCLOSURE

The invention relates to a system and method for determining at least one calculated process parameter of a fluid in a pipe.

BACKGROUND OF THE INVENTION

Industrial process sensors like flow or pressure or viscosity sensors need traditionally invasive installations, needing direct access to the process fluid. In many cases, e.g., in case of explosive or toxic gases, the invasive access involving sealed joints in the piping represents a relevant safety risk (e.g., leakage due to corrosion, erosion or mechanical damage). Only temperature sensors have the potential for less critical installations by using thermowells which are welded into the pipe.

These drawbacks could be avoided by non-invasive measurement of the pressure or of flow or other quantity of interest. For flow, e.g., non-invasive systems are commercially available (mainly ultrasonic systems), but rarely used due to their high cost and sensitivity to installation accuracy. For pressure no commercial non-invasive solution is available. Though many alternatives to measure the pressure through the pipe wall without drilling a hole have been described in the literature, none of the proposed solutions have ever been realized in products due to severe shortcomings and limitations. Especially the very small deformation of pressure piping (due to the pressure vessel design regulations) results in poor resolution and accuracy of non-invasive pressure sensing based on mechanical measurements, so these approaches are not competitive due to their unfavourable cost/performance ratio.

BRIEF SUMMARY OF THE INVENTION

It is therefore an objective of the invention to provide a system for calculating at least one calculated process parameter of a fluid in a pipe. According to an aspect of the disclosure, a system for calculating at least one calculated process parameter of a fluid in a pipe, comprises the following: A data interface, configured for receiving nominal process parameters, wherein the nominal process parameters comprise pipe parameters and at least one fluid parameter, wherein the at least one pipe parameter comprises a geometry of the pipe and/or a material of the pipe, wherein the at least one fluid parameter comprises a nominal viscosity of the fluid, a nominal heat conductivity of the fluid, a nominal pressure of the fluid and/or a nominal velocity of the fluid. An invasive temperature sensor, configured for determining a fluid temperature of the fluid in the pipe. A reference temperature sensor disposed outside of the pipe, configured for determining a reference temperature outside of the pipe. A surface temperature sensor disposed on a surface of the pipe, configured for determining a surface temperature of the pipe. A process model, configured for determining at least one calculated process parameter of the fluid in the pipe by using the determined reference temperature, the determined surface temperature, the received process parameters and the determined fluid temperature.

In other words, a process parameter, for example pressure or velocity of the fluid, can be determined in a non-invasive way. Non-invasive, as used herein, relates to a form of sensing, wherein no probe is inserted into the pipe. In this case, an invasive temperature sensor is used for the determination of the process parameter, however no invasive process parameter is used. This means that no additional invasive sensor is needed beyond an the existing invasive temperature sensor to gain information on process parameters like fluid pressure or fluid velocity. Non-invasive, as used herein, relates to a form of sensing, wherein no probe penetrates the pipe wall or protrudes into the flow of the fluid in the pipe.

The term "nominal process parameter", as used herein, comprises information about the process that is performed using the fluid and the pipe that are known, for example by predetermination or pre-estimation. In other words, the nominal process parameters are provided to the system by a data interface so that the system, in particular the process model is provided with general information about the pipe, the fluid and the process carried out itself. The nominal process parameters are for example stored in a database and just read out by the system. Alternatively, the nominal process parameters are read out from control system information from nearby sensors. Part of the nominal process parameters (e.g. fluid information) can also be provided as input values during device setup.

The term "calculated process parameter", as used herein, relates to an estimation of the process parameter, for example fluid velocity or fluid pressure that is calculated by the process model. In other words, instead of directly measuring a process parameter with an invasive sensor, the process model provides a calculated process parameter that is more accurate than a measuring said process parameter with a non-invasive sensor.

BRIEF DESCRIPTION OF THE SEVERAL VIEWS OF THE DRAWING(S)

FIG. 1 schematically shows a process model for determining at least one calculated process parameter in accordance with the disclosure.

Figure 2:
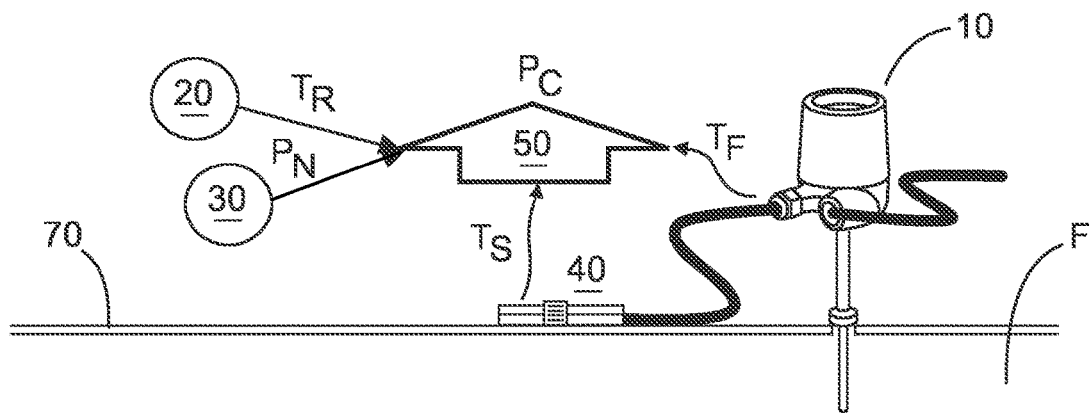

FIG. 2 schematically shows a system for calculating at least one calculated process parameter of a fluid in a pipe in accordance with the disclosure.

Figure 3:
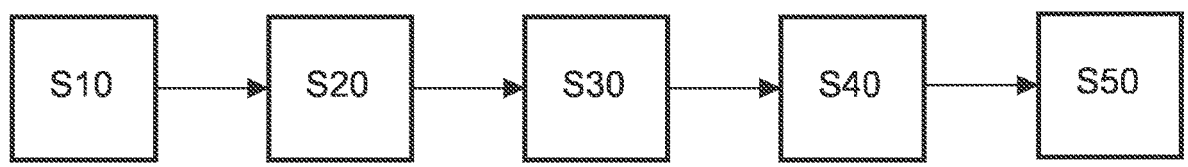

FIG. 3 is a flowchart for a method for calculating at least one calculated process parameter of a fluid in a pipe in accordance with the disclosure.

The reference symbols used in the drawings, and their meanings, are listed in summary form in the list of reference symbols. In principle, identical parts are provided with the same reference symbols in the figures.

DETAILED DESCRIPTION OF THE INVENTION

FIG. 1 schematically shows a process model 50. The process model 50 is configured for determining, or in other words calculating, at least one calculated process parameter $P_C$ of a fluid F in a pipe 70 by using a determined fluid temperature $T_F$, a determined reference temperature $T_R$, a determined surface temperature $T_S$ and received nominal process parameters $P_N$. The process model 50 gets the necessary input data from a plurality of entities connected with the process model 50. The input data is either measured, known, predetermined and/or pre-estimated.

An invasive temperature sensor 10 provides the process model 50 with the fluid temperature $T_F$. The fluid temperature $T_F$ that is measured by the invasive temperature sensor 10 relates to a temperature of the fluid F within the pipe 70, a core temperature of the fluid F in the pipe 70. The invasive temperature sensor 10 comprises a probe that reaches into the pipe 70 to directly measure the fluid temperature $T_F$. The reference temperature $T_R$ reflects the temperature outside of the pipe 70, outside of an insulation of the pipe 70. A data interface 30 provides the process model 50 with at least one nominal process parameter $P_N$. The at least one nominal process parameter $P_N$ reflects nominal properties of the process related to the fluid F in the pipe 70, or in other words, properties of the process that are known, predetermined and/or pre-estimated. The at least one nominal process parameter $P_N$ comprises at least one nominal pipe parameter, reflecting properties of the pipe 70 and at least one nominal fluid parameter, reflecting properties of the fluid F, wherein the at least one nominal pipe parameter comprises a geometry of the pipe 70 and/or a material of the pipe 70, wherein the at least one nominal fluid parameter comprises a nominal viscosity of the fluid F, a nominal heat conductivity of the fluid F, a nominal fluid pressure of the fluid F and/or a nominal fluid velocity of the fluid F. A non-invasive temperature sensor 40, also referred to as surface temperature sensor 40, provides the process model 50 with a surface temperature $T_S$, being the temperature on the outer surface of the pipe 70.

Optionally, a non-invasive process parameter sensor 60 provides the process model 50 with at least one measured process parameter $P_M$. The measured process parameter $P_M$ for example comprise a measured pressure P of the fluid F, a measured velocity of the fluid F, a measured viscosity of the fluid F and/or a measured heat conductivity of the fluid F. In other words, the process model 50 uses the at least one measured process parameter $P_M$ to further enhance the accuracy of the calculation of the calculated process parameter $P_C$.

FIG. 2 schematically shows a system for calculating at least one calculated process parameter $P_C$ of a fluid F in a pipe 70. During a production process, a fluid F runs through a pipe 70. For analysis and/or monitoring reasons, a process parameter, for example the pressure P in the pipe 70 needs to be known. An invasive form of measuring the process parameter is not applicable in most situations, thus a calculation of the calculated process parameter $P_C$ is performed by the process model 50. For non-invasive temperature measurement, the system comprises a surface temperature sensor 40 that is disposed at a pipe surface of the pipe 70. The surface temperature sensor 40 is able to directly determine a surface temperature $T_S$, being the temperature of the outer surface of the pipe 70. In general, the pipe 70 is surrounded by an insulation. Consequently, the surface temperature $T_S$ relates to the temperature on the outside of the pipe 70 under the insulation. In addition, the system comprises a reference temperature sensor 20 that measures the reference temperature $T_R$ outside of the pipe 70, in particular outside of the insulation of the pipe 70. The system further comprises a data interface 30 that is configured for receiving nominal process parameters $P_N$, wherein the nominal process parameters $P_N$ relate to nominal parameters of a process that relates to the fluid F in the pipe 70. In other words, the nominal process parameters $P_N$ comprise information about the fluid F and the pipe 70 that is known or can be estimated to sufficient accuracy due to the nature of the process.

To calculate the at least one calculated process parameter $P_C$, which as described is not directly measured by a sensor, the system comprises a process model 50 that is configured to provide a calculation of the process parameter, referred to as calculated process parameter $P_C$. The process model 50 uses different inputs in addition to the determined fluid temperature $T_F$ to perform an estimation algorithm that provides the calculated process parameter $P_C$. In this case, the process model 50 uses the determined fluid temperature $T_F$, the determined reference temperature $T_R$, the determined surface temperature $T_S$ and the provided nominal process parameters $P_N$.

FIG. 3 schematically shows a method for determining at least one calculated process parameter $P_C$ of a fluid F in a pipe 70. In a first step S10 a data interface 30 received nominal process parameters $P_N$, wherein the nominal process parameters $P_N$ relate to nominal parameters $P_N$ of a process that relates to the fluid F in the pipe 70. In another step S20, an invasive temperature sensor 10 determined a fluid temperature $T_F$ of the fluid F in the pipe 70. In another step S30, a reference temperature sensor 20 disposed outside of the pipe 70, determines a reference temperature $T_R$ outside of the pipe 70. In another step S40, a surface temperature sensor 40 disposed at a surface of the pipe 70, determines a surface temperature $T_S$ of the pipe 70. In another step S50, a process model 50 determines at least one calculated process parameter Pc of the fluid F in the pipe 70 by using the determined reference temperature $T_R$, the determined surface temperature $T_S$, the received nominal process parameters $P_N$ and the determined fluid temperature $T_F$.

Preferably, the surface temperature sensor is a state-of-the-art clamp-on temperature sensor as described in Gebhardt, Jörg/Daake, Wilhelm/Ude, Peter/Schröder, Karsten/Sosale, Guruprasad: Accurate and quickly responsive surface temperature measurement: a step to widespread non-invasive T-measurement in industry, 2019, IEEE International Instrumentation and Measurement Technology Conference, I2MTC, Auckland, New Zealand, May 20-23, or by a standard cable (mineral insulated or not) thermometer, or by an IR temperature sensor.

Preferably, the reference temperature relates to a temperature outside the pipe, in a certain distance of the pipe wall's outer surface. It can be either embedded in the insulation structure or can be outside of it. In the latter case it can be an ambient temperature.

Preferably, the fluid temperature refers to the temperature of the fluid in the center of the pipe that has the largest distance to the pipe walls. For example, for a cylindrical pipe, the center of the pipe extends along the rotation axis of the pipe. In case of an invasive temperature sensor, the invasive temperature sensor extends a probe into the pipe to the center of the pipe to measure the fluid temperature. Consequently, the fluid temperature, provided by the invasive temperature sensor relates to a measured fluid temperature in the center of the pipe.

The sensors, namely the reference temperature sensor, the surface temperature sensor and the invasive temperature sensor are connected to a common electronic unit within which the processing of the signals and the process model, carrying out the calculation of the calculated process parameter, are implemented. Preferably, the fluid is gas or, in general, a compressible fluid.

In gas flow the temperature is not distributed uniformly across the pipe cross-section. The temperature profile, or the temperature difference between the core of the flow and the pipe surface depends on the heat conductivity of the system. The heat conductivity in the fluid depends on various flow parameters, of which pressure has a very large effect. For existing non-invasive temperature sensors, the pressure was found to be a major parameter to enable sufficient accuracy of the model calculation for the fluid temperature.

Preferably, the process model performs its full calculation locally in the system. Alternatively, at least some of the calculations are performed in a cloud service. Furthermore, the process model further preferably uses parametric lookup tables that references predetermined inputs to predetermined outputs to reduce computational capacity requirements of the process model.

Consequently, the system provides a means for non-invasively determining the pressure in fluid, in particular gas, filled pipes. Furthermore, the system can be applied to any pipe featuring at least one invasive temperature sensor, giving information on the fluid temperature at a known distance from the pipe wall. Such invasive temperature measurement points are often implemented with fully welded thermowells, representing a much smaller leakage risk than any pressure.

In a preferred embodiment, the process model is configured for determining a Nußelt number of the fluid by using the fluid temperature and determining the at least one calculated process parameter by using the determined Nußelt number, wherein the Nußelt number depends on a Prandtl number of the fluid and a Reynolds number of the fluid, wherein the Prandtl number and the Reynolds number each depend on the at least one calculated process parameter.

A thermal resistance of a fluid boundary layer, the layer between the fluid and the pipe wall, is particularly relevant for the difference of the pipe surface temperature and the fluid temperature. The boundary layer in a pipe flow is generally not rigorously defined regarding its geometric extension. Nevertheless, its thermal resistance (or inverse thermal conductivity) is usually defined as the thermal resistance connecting (or separating) the inner wall temperature and the average (bulk-) temperature of the medium flowing in the pipe.

The thermal resistance depends on the fluid density, and therefore on pressure, and also on fluid velocity in the pipe. The thermal resistance of the fluid boundary layer in pipe hydrodynamics can be described by the Nußelt number, Nu. It is defined as the ratio of convective to pure conductive heat conductivity across the fluid boundary layer. Nu in many cases first depends on material data of the fluid, in particular on the Prandtl number, Pr, in particular in accordance with equation 1.

$$Pr = \nu/\alpha = \nu \rho c_p/\lambda = \eta c_p/\lambda \qquad \text{Equation 1:}$$

where $\nu$ is the kinematic viscosity of the fluid, $\alpha$ is the thermal diffusivity of the fluid, $\eta$ is the dynamic viscosity of the fluid, $\lambda$ is the thermal conductivity of the fluid cp is the specific heat capacity of the fluid and $\rho$ is the density of the fluid.

The Prandtl number is the ratio of momentum to thermal diffusion constants. It is generally a function of temperature and pressure, but for pressure between 0.1 and 10 bars in gases it is determined just by the adiabatic (isentropic) exponent of the gas. For the fluids of interest, Pr can be determined as exactly as necessary in the form: Pr=Pr(T, P).

The second ingredient for Nu is the Reynolds number, Re, in the situation of interest. Re is determined by material data of the fluid and process parameters as outlined in equation 2:

$$Re = \rho \upsilon d/\eta = \upsilon d/\nu \qquad \text{Equation 2:}$$

where v is the fluid velocity, also referred to as flow or flow velocity, d is the characteristic linear dimension of the pipe, in particular the pipe diameter. As Re depends on the fluid density $\rho$, it therefore depends on pressure P in case of gases. $\eta$ also may be pressure dependent. In a similar manner, for a given pressure, the density of the fluid remains relatively constant, but flow changes have an effect.

In total Nu is defined as outlined in equation 3:

$$Nu = Nu(Re, Pr) = Nu(Re(\ldots, P, \nu), Pr(\ldots, P)) \qquad \text{Equation 3:}$$

Therefore, knowledge of fluid pressure P and/or fluid velocity v will help to increase the estimation accuracy for Re, for Pr, and for Nu.

As described in detail in EP 3537124 B1: For the process temperature Tm the abovementioned considerations lead to a formula where Tm is a function of at least the following variables:

$Tm = f[Tsurface, Treference,$ $Rbl(P, \nu, \nu, \lambda, \rho, \eta, cP, d),$ $Rw(d, dwi, \lambda wi),$ $RF(d\text{insulation}i, \lambda\text{insulation}i, h)] \qquad \text{Equation 4:}$ Here, Rbl is the inverse conductivity (with units: m2 K/W) of the medium boundary layer adjacent to the inner pipe wall surface. Rw is the inverse conductivity of the pipe wall, including possible coatings inside and outside, with thicknesses dwi, and thermal conductivities $\lambda$wi of the materials. RF is the inverse conductivity of the insulation layers, if any, and of outside convective boundary layers. If there is no insulation, the corresponding contribution to inverse conductivity is zero. Whereas in EP 3537124 B1 the setup and model is used to determine Tm, a setup is disclosed where Tm is measured invasively, in order to determine one of the other variables in Equation 4.

According to the disclosure, if all but one of the independent variables on the right side of Equation 4 are known or can be estimated (this would be the parameters PN), the one remaining unknown variable (PC) can be calculated by inverting the expression in Equation 4. This is possible, at least locally in the space of independent variables, under very general regularity conditions according to the implicit function theorem, well known from classical analysis (e.g. A. N. Kolmogorov, S. V. Fomin, "Elements of the theory of functions and functional analysis," Vols. 1-2, Martino Fine Books (2012).

The invention also is to be understood to include cases when there are more influence factors than explicitly shown in Equation 4 (e.g., in complex flow situations where entry length L and roughness or friction factors (see EP 3537124 B1) of the pipe or other variables may play a role). The basic procedure and learning, then, remains the same.

In the system as described in EP 3537124 B1, a measured value for P and/or v, or some other estimate of P and/or v can be used for a subsequent calculation of the three dimensionless variables, leading to the determination of the accurate estimation of the fluid temperature.

Therefore, according to the present invention, by inverting the original calculation model for the temperature difference between the fluid velocity and the pipe surface or the reference temperature, the knowledge of both temperatures can help to quantify the value of at least one of the process parameters in Equation 4 and in subsequent sections, in particular, either the fluid pressure or of the fluid velocity.

The concept can be extended also to the measurement of the pressure in fluid tanks or vessels equipped with at least one invasive temperature measurement point.

In a preferred embodiment, the nominal process parameters comprise at least one pipe parameter and at least one fluid parameter, wherein the at least one pipe parameter comprises a geometry of the pipe and/or a material of the pipe, wherein the at least one fluid parameter comprises a nominal viscosity of the fluid, a nominal heat conductivity of the fluid, a nominal pressure of the fluid and/or a nominal velocity of the fluid.

In a preferred embodiment, the at least one calculated process parameter comprises a calculated pressure of the fluid, a calculated velocity of the fluid, a calculated viscosity of the fluid and/or a calculated heat conductivity of the fluid or any of the quantities mentioned in Equation 4 and subsequent sections.

Due to the relationship between the different process parameters and the fluid temperature, calculations or statements about fluid pressure, fluid velocity, fluid viscosity and/or fluid heat conductivity can be made by the process model.

In a preferred embodiment, the system comprises a process parameter sensor, configured for determining at least one measured process parameter. The process model is configured for determining the at least one calculated process parameter by using the at least one measured process parameter.

Due to the relationship between the different process parameters and the fluid temperature, each additional information about the process can be used to further improve the accuracy of the calculation. In other words, when calculating a calculated process parameter, measurements of other process parameters can enhance the accuracy of the calculation. For example, when the process model calculates a pressure of the fluid, the accuracy of the calculation can be enhanced by a measurement of the velocity of the fluid, in particular by a non-invasive velocity sensor. The more additional process parameters are measured, the higher is the accuracy of the calculation of the calculated process parameter.

In a preferred embodiment, the at least one measured process parameter comprises a measured pressure of the fluid, a measured velocity of the fluid, a measured viscosity of the fluid and/or a measured heat conductivity of the fluid.

In a preferred embodiment, the process parameter sensor comprises a non-invasive process parameter sensor.

Non-invasive process parameter sensors can be applied to the system, in particular to the pipe more easily and more secure than invasive process parameter sensors. Although the accuracy of the non-invasive process parameter sensors is usually worse than the accuracy of invasive process parameter sensors, each additional information for the process model enhances the calculation accuracy of the process model.

In a preferred embodiment, the non-invasive process parameter sensor comprises a non-invasive velocity sensor, which is configured for determining the measured velocity of the fluid in a non-invasive way.

Preferably, the non-invasive velocity sensor is an ultrasonic sensor that is configured for determining the fluid velocity in a non-invasive way. Further preferably, the process model uses said determined fluid velocity to calculate a calculated fluid pressure.

In a preferred embodiment, the non-invasive process parameter sensor is integrated into the surface temperature sensor.

In a preferred embodiment, the surface temperature sensor comprises a clamping system that is configured for attaching the surface temperature sensor on a surface of the pipe. The non-invasive process parameter sensor can be, e.g., a non-invasive pressure sensor that is integrated into the clamping system.

In this example, the calculated process parameter is preferably the fluid velocity. The fluid velocity shares a strong physical relationship with the pressure in the pipe and the fluid temperature as well as the surface temperature. Consequently, the non-invasive pressure sensor that is integrated into the surface temperature sensor provides a measured pressure of the fluid to the process model in order to calculate the calculated fluid velocity. Thus, the additional non-invasive process parameter sensor is attached to the pipe together with the surface temperature sensor, allowing a simple addition of the non-invasive process parameter sensor to the pipe.

In a preferred embodiment, the non-invasive process parameter sensor comprises a non-invasive pressure sensor that is integrated into the clamping system by a strain gauge on a clamp strip, a tensile force sensor in the clamp or a compressive force sensor between the clamp and the pipe surface.

According to an aspect of the invention, a method for calculating calculated process parameters of a fluid in a pipe comprises the following steps. Receiving, by a data interface, nominal process parameters, wherein the nominal process parameters comprise pipe parameters and at least one fluid parameter, wherein the at least one pipe parameter comprises a geometry of the pipe and/or a material of the pipe, wherein the at least one fluid parameter comprises a nominal viscosity of the fluid, a nominal heat conductivity of the fluid, a nominal pressure of the fluid and/or a nominal velocity of the fluid. Determining, by an invasive temperature sensor, a fluid temperature of the fluid in the pipe. Determining, by a surface temperature sensor disposed on a surface of the pipe, the surface temperature of the pipe. Determining, by a reference temperature sensor disposed outside of the pipe a reference temperature outside of the pipe. Determining, by a process model, at least one calculated process parameter of the fluid in the pipe by using the determined reference temperature, the determined surface temperature, the received process parameters and the determined fluid temperature.

According to an aspect of the invention, a computer program comprises instructions, which, when the program is executed by a computer, cause the computer to carry out the steps of a method, as described herein.

According to an aspect of the invention, a computer-readable medium comprises instructions which, when executed by a computer, cause the computer to carry out the steps of a method, as described herein.

LIST OF REFERENCE SYMBOLS 10 invasive temperature sensor
20 reference temperature sensor
30 data interface
40 surface temperature sensor
50 process model
60 process parameter sensor
70 pipe
F fluid $P_N$ nominal process parameter
$T_F$ fluid temperature
$T_R$ reference temperature
$T_S$ surface temperature
$P_C$ calculated process parameter
$P_M$ measured process parameter
S10 receiving nominal process parameters
S20 determining a fluid temperature
S30 determining a reference temperature
S40 determining a surface temperature
S50 determining at least one calculated process parameter All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for determining at least one calculated process parameter of a fluid in a pipe, comprising:
   a data interface configured for receiving nominal process parameters, wherein the nominal process parameters relate to nominal parameters of a process that relates to the fluid in the pipe;
   an invasive temperature sensor configured for determining a fluid temperature of the fluid in the pipe;
   a reference temperature sensor disposed outside of the pipe and configured for determining a reference temperature outside of the pipe;
   a surface temperature sensor disposed at a surface of the pipe and configured for determining a surface temperature of the pipe;
   a process model configured for determining at least one calculated process parameter of the fluid in the pipe by using the determined reference temperature, the determined surface temperature, the received nominal process parameters, and the determined fluid temperature.

2. The system of claim 1, wherein the process model is further configured for:
   determining a Nußelt number of the fluid by using the fluid temperature;
   determining the at least one calculated process parameter by using the determined Nußelt number, wherein the Nußelt number depends on a Prandtl number of the fluid and a Reynolds number of the fluid, wherein the Prandtl number and the Reynolds number each depend on the at least one calculated process parameter.

3. The system of claim 1, wherein the nominal process parameters comprise at least one pipe parameter and at least one fluid parameter, wherein the at least one pipe parameter comprises a geometry of the pipe and/or a material of the pipe, wherein the at least one fluid parameter comprises a nominal viscosity of the fluid, a nominal heat conductivity of the fluid, a nominal pressure of the fluid and/or a nominal velocity of the fluid.

4. The system of claim 1, wherein the at least one calculated process parameter comprises a calculated pressure of the fluid, a calculated velocity of the fluid, a calculated viscosity of the fluid and/or a calculated heat conductivity of the fluid.

5. The system of claim 1, further comprising:
   a process parameter sensor configured for determining at least one measured process parameter;
   wherein the process model is further configured for determining the at least one calculated process parameter using the at least one measured process parameter.

6. The system of claim 1, wherein the at least one measured process parameter comprises a measured pressure of the fluid, a measured velocity of the fluid, a measured viscosity of the fluid and/or a measured heat conductivity of the fluid.

7. The system of claim 6, wherein the process parameter sensor comprises a non-invasive process parameter sensor.

8. The system of claim 7, wherein the non-invasive process parameter sensor comprises a non-invasive velocity sensor, which is configured for determining the measured velocity of the fluid in a non-invasive way.

9. The system of claim 7, wherein the non-invasive process parameter sensor is integrated into the surface temperature sensor.

10. The system of claim 2, wherein the surface temperature sensor comprises a clamping system that is configured for attaching the surface temperature sensor on a surface of the pipe; and wherein the non-invasive process parameter sensor is a non-invasive pressure sensor that is integrated into the clamping system.

11. The system of claim 10, wherein the non-invasive process parameter sensor comprises a non-invasive pressure sensor that is integrated into the clamping system by a strain gauge on a clamp strip, a tensile force sensor in the clamp or a compressive force sensor between the clamp and the pipe surface.

12. A method for determining a calculated process parameters of a fluid in a pipe, comprising:
   receiving, by a data interface, nominal process parameters, wherein the nominal process parameters relate to nominal parameters of a process that relates to the fluid in the pipe;
   determining, by an invasive temperature sensor, a fluid temperature of the fluid in the pipe;
   determining, by a reference temperature sensor disposed outside of the pipe, a reference temperature outside of the pipe;
   determining, by a surface temperature sensor disposed at a surface of the pipe, a surface temperature of the pipe;
   determining, by a process model, at least one calculated process parameter of the fluid in the pipe by using the determined reference temperature, the determined surface temperature, the received nominal process parameters and the determined fluid temperature.

* * * * *